F. H. SHEPARD.
MOTOR CONTROL SYSTEM.
APPLICATION FILED MAY 15, 1905.
947,313.
Patented Jan. 25, 1910.
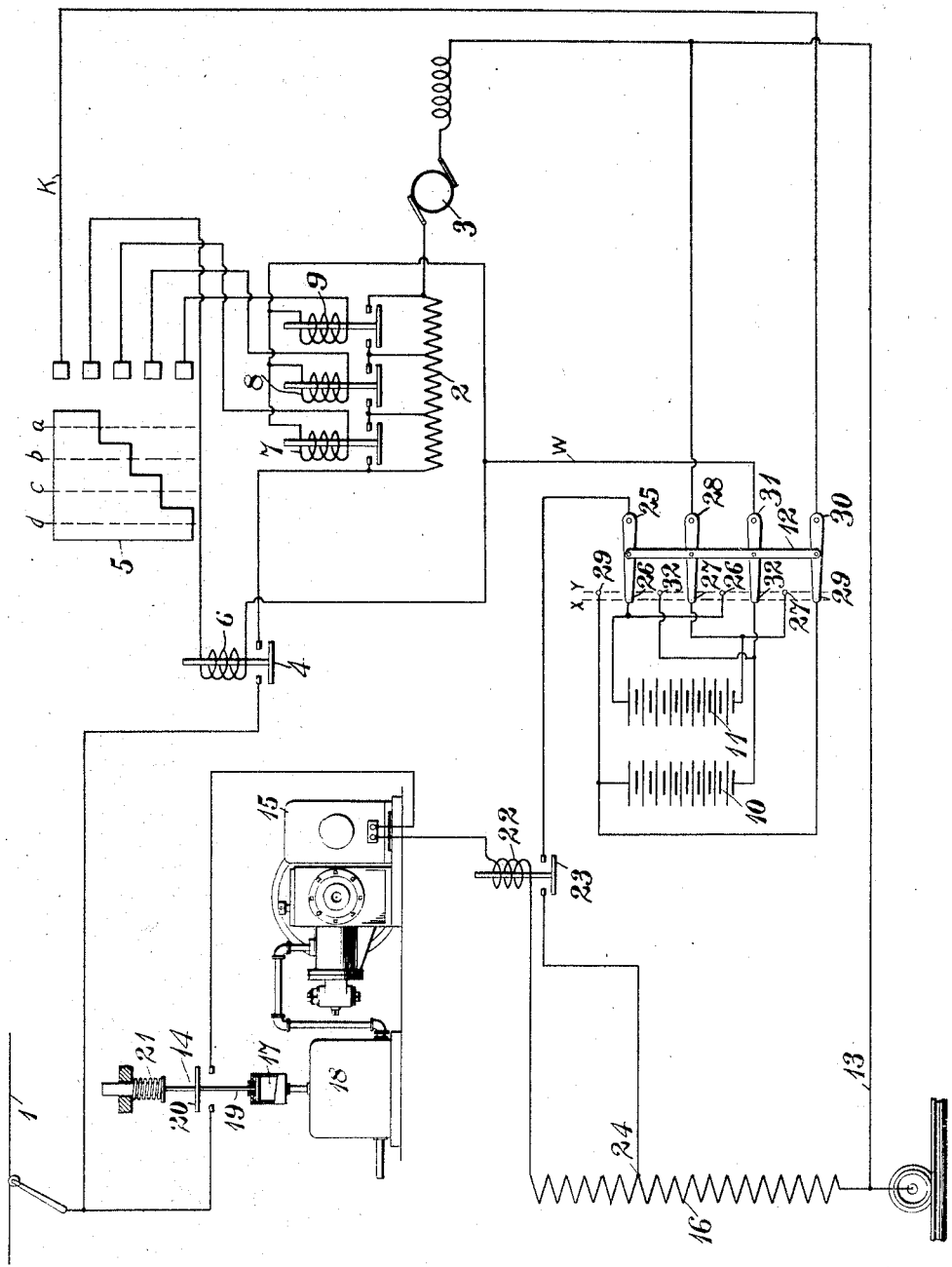
WITNESSES:
Fred H. Miller
R. J. Dearborn
INVENTOR
Francis H. Shepard
BY
Wesley G. Carr
ATTORNEY

UNITED STATES PATENT OFFICE.

FRANCIS H. SHEPARD, OF PITTSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

947,313.  Specification of Letters Patent.  Patented Jan. 25, 1910.

Application filed May 15, 1905.  Serial No. 260,487.

*To all whom it may concern:*

Be it known that I, FRANCIS H. SHEPARD, a citizen of the United States, and a resident of Pittsburg, in the county of Allegheny and State of Pennsylvania, have invented a new and useful Improvement in Motor-Control Systems, of which the following is a specification.

My invention relates to systems for governing the charging and discharging of secondary electric batteries, and particularly to battery systems that are used in connection with control systems for electric railway vehicle motors.

One object of my invention is to provide means for intermittingly charging a plurality of control line supply batteries that shall insure the availability for service of one or more of said batteries at any time.

A further object of my invention is to automatically prevent the discharge of a battery which is connected to the charging circuit in case the applied voltage falls below a predetermined amount.

It is usual to provide electric railway vehicles which are equipped with air compressors and storage tanks, for pneumatic brakes or control, with a governor for automatically applying power to the compressor motor when the pressure in the storage tank falls below a predetermined value. The use of the air brake which tends to lower the pressure in the supply tanks is roughly related to the amount of current taken from the control batteries, since every stop or slow-down involves the use of the control system to again accelerate the vehicle, so that an arrangement which supplies charging current to the batteries only when the compressor motor is in operation may easily be arranged to fully recharge a battery in a time substantially equal to that during which it was in operation.

The battery supply circuit does not necessarily depend upon an air compressor motor circuit for its power, but may be supplied from any convenient source. It is more desirable, however, to select a source which will supply energy to the battery during a substantially fixed percentage of time in each day or week without doing so continuously, such as a lighting, heating or compressor motor circuit. By providing a pair of similar batteries on the same vehicle and a change-over switch for alternately changing their connections respectively from the charging line to the control line, and vice versa, one of the two is independent of the charging system and may always be ready for use.

The single figure of the accompanying drawing shows, diagrammatically, a battery system that embodies my invention, in which, for convenience of illustration, the supply circuit is dependent upon a compressor motor circuit for its energy and the control system supplied from the batteries is applied to a single motor.

Referring to the drawing, direct current electrical energy is supplied from a positive line conductor 1 through a resistance 2 to a motor 3. The resistance 2 and a main line circuit-breaker 4 are controlled by a master switch 5 which supplies energy, through a conductor $h$, to a plurality of actuating coils 6, 7, 8 and 9 from either storage battery 10 or a similar battery 11, according to the position of a change-over switch 12 that may occupy either position X or position Y.

As the master switch 5 successively occupies a plurality of positions $a$, $b$, $c$ and $d$, the coils 6, 7, 8 and 9 are successively actuated to close the circuit-breaker 4 and to short-circuit the resistance 2, one portion at a time, until full line voltage is applied to the motor. The negative terminal of the motor 3 is connected to the return line circuit 13 in the usual manner. Electrical energy may also be applied, through a governor switch 14, to a compressor motor 15 and to a regulating resistance 16, which are connected in series; the negative terminal of the resistance being connected to the negative line conductor 13.

The governor switch 14 comprises a relatively small cylinder 17, piped to a fluid-pressure storage tank 18, and a piston 19 which carries a contact piece 20 and is actuated either by a spring 21 to close the compressor motor circuit or by the fluid-pressure in the tank, when it exceeds the spring pressure, to open the motor circuit. The tank 18 may supply pressure to actuate a system of brakes in the usual manner or for other purposes. As energy passes through the contact piece 20 of the switch 14 it energizes the magnet winding 22 of a switch 23 to close a circuit from tap 24, intermediate the terminals of the resistance 16, that is chosen to give a proper voltage for charging the batteries 10 and 11.

When the change-over switch 12 occupies position X, a circuit is completed, from tap 24 of the resistance 16, through the switch 23, terminals 25 and 26 of switch 12, to one terminal of the battery 11, the other terminal of the battery being connected, through terminals 27 and 28 of switch 12, to negative line terminal 13. A circuit is also completed, from the battery 10, through terminals 29 and 30 of switch 12 and the conductor K, to the control system as hereinbefore described, the return circuit being completed through a conductor W and terminals 31 and 32 of switch 12. When switch 12 is in position Y, a circuit is completed in a similar manner except that the batteries are interchanged, current being applied from tap 24 to the battery 10 and current being applied to line K from battery 11, since terminals 25, 28, 31 and 30 are respectively connected to terminals 29, 32, 26 and 27. The switch 23 is closed by current flowing through the coil 22 and the resistance 16 to allow the battery that is connected to the tap 24 to be charged when current is supplied to the resistance 16, but is opened to prevent the battery from being short-circuited through a portion of the resistance and also to prevent it from delivering current to the pump motor or other translating device when no charging current is supplied to the battery.

Although I have shown and described a specific circuit arrangement and a single motor controlled by a plurality of electromagnetic switches which are energized by current from a storage battery system embodying my invention, I wish it to be understood that said system may supply energy for any convenient purpose and that any arrangement which does not substantially depart from the spirit of my invention shall be included in its scope.

I claim as my invention:

1. The combination with a fluid compressor, a storage reservoir supplied therefrom, a driving motor for the compressor, a resistance in series therewith, a supply circuit for the motor, and means for automatically closing the supply circuit when the fluid-pressure in the reservoir falls below a predetermined amount, of an auxiliary circuit connected to said resistance intermediate its ends, and means for closing the auxiliary circuit only when energy is supplied to the motor.

2. The combination with a fluid compressor, a driving motor therefor, a motor supply circuit and a resistance in series with the motor, of a battery charging circuit connected to said resistance intermediate its ends, means for closing the battery circuit only when energy is supplied to the motor, and means for supplying energy to the motor only when the fluid-pressure in the reservoir falls below a predetermined limit.

3. The combination with a storage battery, a charging circuit therefor, and a resistance in parallel circuit with said battery, of a supply circuit which includes said resistance and from which said charging circuit is derived, means tending to intermittently interrupt the supply circuit, and means for automatically interrupting the charging circuit when the supply circuit is interrupted.

4. The combination with a translating device to which energy is intermittently supplied, a resistance in series therewith and a battery charging circuit connected to an intermediate point in the resistance, of automatic means for interrupting the charging circuit when the supply circuit is interrupted.

5. The combination with two storage batteries and selective means for connecting one of said batteries to a charging circuit, a resistance in parallel circuit with the one or the other of said batteries and a supply circuit therefor, of means for automatically opening said charging circuit when no current flows in said supply circuit.

6. The combination with a control system, two storage batteries, a selective switch for connecting one of said batteries to a charging circuit and the other to said system, and a resistance in parallel with said charging circuit, of means for closing said charging circuit when current is supplied to said resistance and for automatically opening said circuit when the current ceases.

7. The combination with a storage battery, a receiving circuit and a charging circuit therefor, and a resistance in parallel with said charging circuit, of means for connecting one portion of said battery to said receiving circuit while the remaining portion is connected to said charging circuit and for interchanging the connections of said battery portions, and means for closing said charging circuit only when energy is supplied thereto.

8. The combination with a fluid-pressure reservoir, a compressor therefor, an electric driving motor for the compressor and a supply circuit for the motor, of a resistance connected in series with the motor, a battery charging circuit connected to an intermediate point in the resistance, and automatic means indirectly dependent upon the pressure in the storage reservoir for interrupting the battery charging circuit.

9. The combination with an electric circuit comprising one or more translating devices, a resistance in series therewith, a battery-charging circuit connected to said resistance intermediate its ends, a battery-discharging circuit, and a storage battery one portion of which is connected to said charging circuit while the remaining portion is connected to said discharging circuit, of means for interchanging the connections of said battery portions, and means for closing said charging circuit only when energy is supplied to said translating devices.

In testimony whereof, I have hereunto subscribed my name this 11th day of May, 1905.

FRANCIS H. SHEPARD.

Witnesses:
 WILLIAM COOPER,
 BIRNEY HINES.